United States Patent
Kim et al.

(10) Patent No.: US 11,640,364 B2
(45) Date of Patent: May 2, 2023

(54) APPARATUS AND METHOD FOR INTERRUPT CONTROL

(71) Applicant: DAEGU GYEONGBUK INSTITUTE OF SCIENCE AND TECHNOLOGY, Daegu (KR)

(72) Inventors: Dae Hoon Kim, Daegu (KR); Ki Dong Kang, Daegu (KR); Hyung Won Park, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 0 days.

(21) Appl. No.: 17/405,132

(22) Filed: Aug. 18, 2021

(65) Prior Publication Data

US 2022/0188252 A1 Jun. 16, 2022

(30) Foreign Application Priority Data

Dec. 14, 2020 (KR) ........................ 10-2020-0174846

(51) Int. Cl.
*G06F 13/24* (2006.01)
*G06F 1/3215* (2019.01)

(52) U.S. Cl.
CPC ............ *G06F 13/24* (2013.01); *G06F 1/3215* (2013.01)

(58) Field of Classification Search
CPC ......... G06F 13/00; G06F 13/24; G06F 1/3215
See application file for complete search history.

(56) References Cited

U.S. PATENT DOCUMENTS

| | | | |
|---|---|---|---|
| 10,747,298 B2 | 8/2020 | Gada et al. | |
| 2009/0006876 A1* | 1/2009 | Fukatani | G06F 3/0625 713/320 |
| 2014/0344595 A1* | 11/2014 | Jenne | G06F 13/4282 713/320 |
| 2017/0336988 A1* | 11/2017 | Kim | G06F 3/0685 |
| 2019/0163251 A1* | 5/2019 | Gada | G06F 1/329 |
| 2020/0125396 A1* | 4/2020 | Chynoweth | B60K 35/00 |

FOREIGN PATENT DOCUMENTS

| | | |
|---|---|---|
| KR | 10-2009-0017918 | 2/2009 |
| KR | 10-2012-0063436 | 6/2012 |
| KR | 10-2017-0131738 | 11/2017 |
| KR | 10-2020-0092365 | 8/2020 |

OTHER PUBLICATIONS

KIPO, Office Action of KR 10-2020-0174846 dated Jul. 13, 2022.
Ki-Dong Kang et al., "Improving the Efficiency of Power Management via Dynamic Interrupt Management", IEEE International Conference on Computer Design, 377-380.

* cited by examiner

*Primary Examiner* — Henry Tsai
*Assistant Examiner* — Kim T Huynh
(74) *Attorney, Agent, or Firm* — Lex IP Meister, PLLC

(57) ABSTRACT

Provided are an apparatus and a method for controlling an interrupt rate for a processor based on processor utilization. Accordingly, it is possible to improve an I/O response latency and improve energy efficiency.

16 Claims, 4 Drawing Sheets

FIG. 3
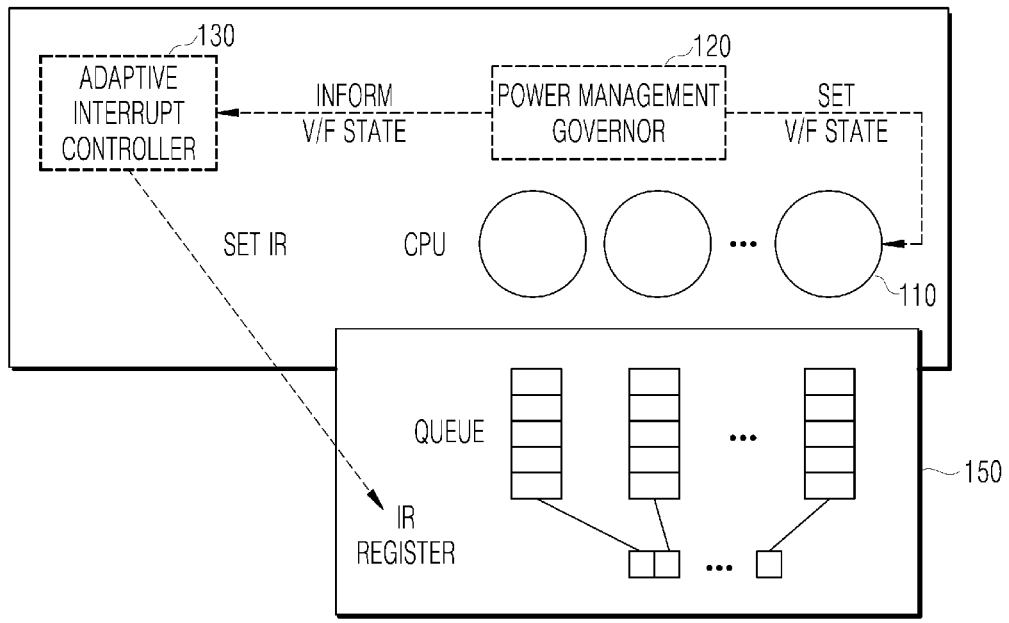
FIG. 4
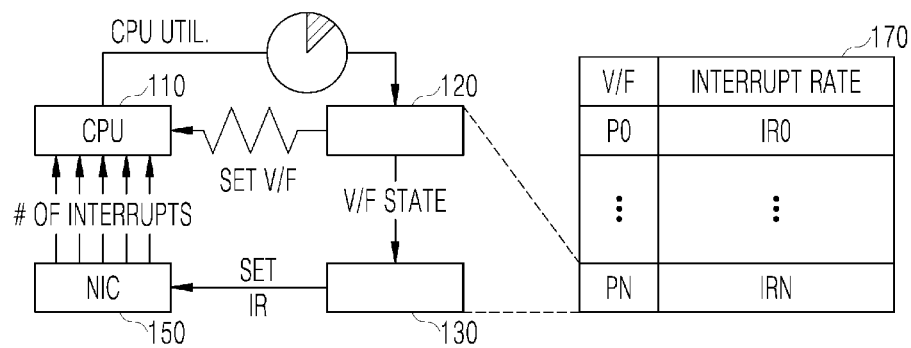
FIG. 5
| V/F STATE | P0 | P1 | ... | P10 |
|---|---|---|---|---|
| INTERRUPT RATE | IR0 | IR1 | ... | IR10 |

APPARATUS AND METHOD FOR INTERRUPT CONTROL

CROSS-REFERENCE TO RELATED APPLICATION

Pursuant to 35 U.S.C. § 119(a), this application claims the benefit of an earlier filing date and priority to Korean Patent Application No. 10-2020-0174846 filed in the Republic of Korea on Dec. 14, 2020, the contents of which are incorporated by reference herein in its entirety.

BACKGROUND OF THE INVENTION

Field of the Invention

The present disclosure relates to an apparatus and a method for interrupt control, and more particularly, to an apparatus and a method for controlling an interrupt rate for a processor based on processor utilization.

Discussion of the Related Art

The content to be described below is only provided for the purpose of providing background information related to exemplary embodiments of the present disclosure, and the content to be described below does not constitute prior art.

An interrupt is a method used so that an external I/O device with a relatively slower rate than a processor with a fast rate provides notification of an input of an external I/O request or notifies the processor of the completion of the requested I/O.

When the processor receives the interrupt, the processor suspends the execution of a program, identifies an interrupt number, calls a corresponding interrupt handler to process the interrupt, and then resumes the execution of the program.

However, as the performance of the external I/O device improves, a problem occurs in which the number of interrupts caused by the I/O device increases, and the processor does not process other operations due to the overhead of processing such interrupts.

Further, since interrupts can be frequently generated when the processor is not available, or the interrupt generation can be deferred even when the processor is available, generation of the interrupt without considering the state of the processor may increase the latency of the application.

There is a need for interrupt control considering the state and energy efficiency of the processor.

SUMMARY OF THE INVENTION

An aspect of the present disclosure is to provide an interrupt control apparatus configured to control an interrupt rate based on processor utilization.

Another aspect of the present disclosure is to provide an interrupt control method considering energy efficiency and latency based on offline profiling.

Aspects of the present disclosure are not limited to the above-mentioned aspects, and other aspects and advantages of the present disclosure, which are not mentioned, will be understood through the following description, and will become apparent from the embodiments of the present disclosure. It is also to be understood that the aspects and advantages of the present disclosure may be realized by means and combinations thereof set forth in claims.

An interrupt control apparatus according to an embodiment of the present disclosure may include a power management governor configured to monitor a power state of a processor executing an application involving an I/O load for a peripheral device, and an interrupt controller configured to control an interrupt rate generated by the peripheral device for the processor based on the power state of the processor, wherein the interrupt controller may be configured to control the interrupt rate according to a change in the power state of the processor corresponding to a utilization of the processor while the application is being executed.

An interrupt control method according to another embodiment of the present disclosure includes the steps of monitoring, by a power management governor, a power state of a processor executing an application involving an I/O load for a peripheral device, and controlling, by an interrupt controller, an interrupt rate generated by the peripheral device for the processor based on the power state of the processor, wherein the controlling of the interrupt rate may include controlling the interrupt rate according to a change in the power state of the processor corresponding to a utilization of the processor while the application is being executed.

Other aspects, features, and advantages than those described above will become apparent from the following drawings, claims, and detailed description of the present disclosure.

According to embodiments of the present disclosure, it is possible to improve an I/O response latency by controlling an interrupt rate considering processor utilization.

According to embodiments of the present disclosure, it is possible to enhance the energy efficiency of the processor while also guaranteeing an I/O response latency.

The effects of the present disclosure are not limited to those mentioned above, and other effects not mentioned can be clearly understood to those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which:

FIG. 3 is a diagram for describing an interrupt control process of the interrupt control apparatus according to an embodiment;

FIG. 4 is a diagram for illustratively describing an interrupt control process of the interrupt control apparatus according to an embodiment;

FIG. 5 illustrates an example of a mapping table of an offline profiling result used in the interrupt control process according to an embodiment;

DETAILED DESCRIPTION OF THE EMBODIMENTS

Figure 1:
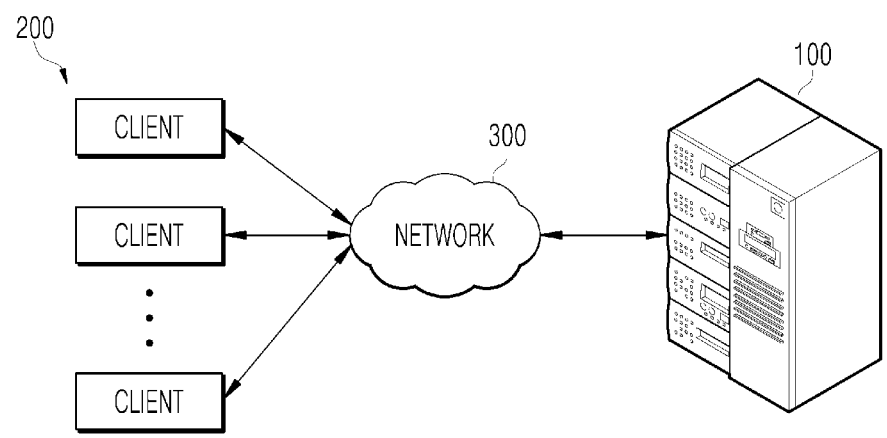
FIG. 1 is a diagram schematically illustrating an exemplary operation environment of an interrupt control apparatus according to an embodiment.

Advantages and features of the present disclosure and methods for achieving them will become apparent from the descriptions of aspects herein below with reference to the accompanying drawings. However, the present disclosure is not limited to the aspects disclosed herein but may be implemented in various different forms. In the following exemplary embodiments, parts not directly related to the description are omitted in order to clearly explain the present disclosure, but it does not mean that the omitted configuration is unnecessary in implementing an apparatus or system to which the spirit of the present disclosure is applied. The aspects are provided to make the description of the present disclosure thorough and to fully convey the scope of the present disclosure to those skilled in the art. It is to be noted that the scope of the present disclosure is defined only by the claims.

The shapes, sizes, ratios, angles, the number of elements given in the drawings are merely exemplary, and thus, the present disclosure is not limited to the illustrated details. Like reference numerals designate like elements throughout the specification.

In relation to describing the present disclosure, when the detailed description of the relevant known technology is determined to unnecessarily obscure the gist of the present disclosure, the detailed description may be omitted.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Hereinafter, the present disclosure will be described in detail with reference to the accompanying drawings.

FIG. 1 is a diagram schematically illustrating an exemplary operation environment of an interrupt control apparatus according to an embodiment.

An interrupt control apparatus 100 may provide interrupt control for efficiently processing an I/O load of a processor for an external I/O device in various application environments.

In one example, the interrupt control apparatus 100 may be a server for processing a service request of a client 200 in a network 300 environment. The server may be a server which receives a service request of the client 200 through the network 300, performs an operation corresponding to the service request, and transmits a response thereto to the client 200 through the network 300.

In this case, for example, the interrupt control apparatus 100 may control a generation rate of interrupts caused by a network interface controller (NIC).

Figure 2:
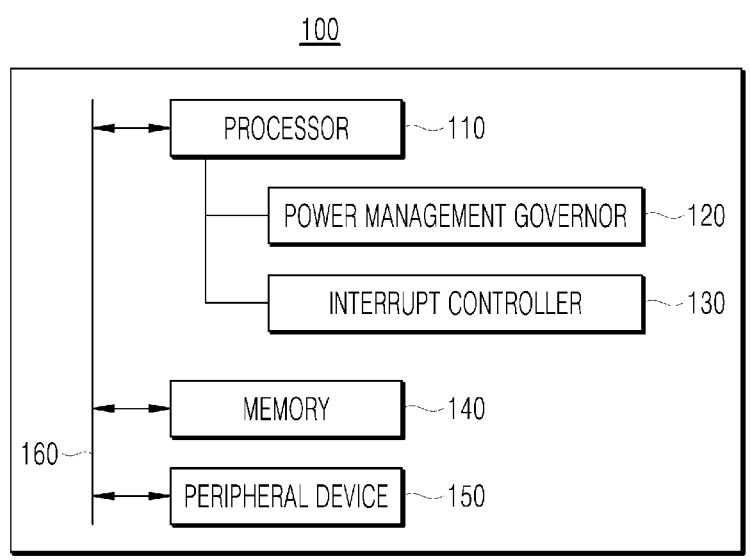
FIG. 2 is a block diagram of the interrupt control apparatus according to an embodiment.

Referring to FIG. 2 to be described below, the interrupt control apparatus 100 may be a computing device including a processor 110 and a memory 140.

The network 300 may be any suitable communication network, including wired and wireless networks, such as a local area network (LAN), a wide area network (WAN), the Internet, an intranet, and an extranet, and mobile networks, such as cellular, 3G, LTE, 5G, a WiFi network, an ad hoc network, and combinations thereof.

The network 300 may include a connection of network elements such as a hub, a bridge, a router, a switch, and a gateway. The network 300 may include one or more connected networks, for example, a multi-network environment, including a public network such as the Internet and a private network such as a secure corporate private network. Access to the network 300 may be provided via one or more wired or wireless access networks.

FIG. 2 is a block diagram of the interrupt control apparatus according to an embodiment of the present disclosure.

The interrupt control apparatus 100 according to this embodiment may include a processor 110 and a memory 140.

The processor 110 is a kind of central processing unit, and may execute one or more instructions stored in the memory 140 to control the operation of the interrupt control apparatus 100. The processor 110 may include all types of devices capable of processing data.

The processor 110 may refer to a data processing device built in hardware, which includes physically structured circuits in order to perform functions represented as codes or instructions contained in a program. As such, examples of the data processing device embedded in the hardware include, but are not limited to, processing devices such as a microprocessor, a central processing unit (CPU), a processor core, a multiprocessor, an application-specific integrated circuit (ASIC), and a field programmable gate array (FPGA). The processor 110 may include one or more processors.

The interrupt control apparatus 100 may further include a power management governor 120 and an interrupt controller 130.

The power management governor 120 may monitor a power state of the processor 110, and store power state information of the processor 110 in a storage to which the interrupt controller 130 can access. Here, the storage may be the memory 140 and/or one or more registers.

The interrupt controller 130 may control an interrupt rate based on the power state information of the processor 110. Here, the interrupt rate means the number of interrupts per unit time for the processor 110 of an external I/O device.

The power management governor 120 and the interrupt controller 130 may be implemented by a program executable by the processor 110. The processor 110 may execute the corresponding program stored in the memory 140 to execute the power management governor 120 and the interrupt controller 130, respectively.

The interrupt control apparatus 100 may further include the memory 140.

The memory 140 may store instructions and the like for executing an interrupt control process by the interrupt control apparatus 100. The memory 140 may store executable programs for implementing the operations of the power management governor 120 and the interrupt controller 130.

The processor 110 may execute an interrupt control process according to an embodiment based on the programs and instructions stored in the memory 140.

The memory 140 may further store information (e.g., a mapping table of interrupt rate for each power state) generated as a result of performing offline profiling to be described below.

The memory 140 may include an internal memory and/or an external memory, and may include a volatile memory such as a DRAM, SRAM, or SDRAM, a non-volatile memory such as one time programmable ROM (OTPROM), PROM, EPROM, EEPROM, mask ROM, flash ROM, NAND flash memory, or NOR flash memory, a flash drive such as an SSD (Solid State Drive), compact flash (CF) card, SD (Secure Digital) card, micro-SD card, mini-SD card, Xd card, or a memory stick, or a storage device such as an HDD (Hard Disk Drive). The memory 140 may include magnetic storage media or flash storage media, but is not limited thereto.

A peripheral device 150, as an external I/O device, refers to a device capable of generating at least one interrupt to the processor 110. For example, the peripheral device 150 may include a network interface controller (NIC), and a memory 140 such as an SSD.

In one example, the peripheral device 150 may include a register for storing interrupt setting information (e.g., interrupt rate information) of the peripheral device 150. The peripheral device 150 may store a packet for a service request queued in a queue in the memory 140 through direct memory access (DMA), and transmit an interrupt signal to the processor 110 via a bus 160.

The processor 110 may read and execute one or more instructions from the memory 140, and read data from the peripheral device 150 or write data to the peripheral device 150. When there is data required for processing of the processor 110, or when an input/output (I/O) load requiring processing by the processor 110 occurs such as when data required by the processor 110 is prepared, the peripheral device 150 may generate an interrupt in the processor 110.

The bus 160 is a logical/physical path of connecting the processor 110, the memory 140, and the peripheral device 150. The processor 110 may perform read/write for the memory 140 and the peripheral device 150 through the bus 160.

FIG. 3 is a diagram for describing an interrupt control process of the interrupt control apparatus according to an embodiment of the present disclosure.

While the processor 110 is executing an application involving an I/O load for the peripheral device 150, the power management governor 120 may monitor a power state V/F State of the processor 110. The power management governor 120 may monitor the power state V/F State of the processor 110 for each unit time or periodically.

The power management governor 120 may control an operation rate and voltage of the processor 110 dynamically using dynamic voltage and frequency scaling (DVFS) to dynamically control an energy consumption amount. As an example, the power management governor 120 may control a voltage applied to a voltage regulator connected to a core of the processor 110 using the DVFS so as to control an operational frequency of the core.

The power management governor 120 periodically monitors the requirements of the CPU, and may increase the voltage and frequency when the CPU requirements are large, and may decrease the energy consumption amount by lowering the voltage and frequency when the CPU requirements are small.

The interrupt control apparatus 100 according to the embodiment may control the generation rate of the interrupt by the I/O device based on such a power management method so that the state of the processor 110 is directly reflected.

As an example, the power management governor 120 may provide the power state V/F State of the processor 110 to the interrupt controller 130 for each unit time or periodically.

For example, the power management governor 120 may generate a message or event including the information on the power state V/F State and transmit the generated message or event to the interrupt controller 130. For example, the power management governor 120 may store the information on the power state V/F State in a storage (e.g., the memory 140 or the register) accessible by the interrupt controller 130, and transmit an alarm message or event to the interrupt controller 130.

As an example, when a monitored power state V/F State_2 is different from a previous power state V/F State_1, the power management governor 120 may provide information about a corresponding changed power state V/F State_2 to the interrupt controller 130.

For example, the power management governor 120 may generate a message or event including the information on the changed power state V/F State_2, and transmit the generated message or event to the interrupt controller 130. For example, the power management governor 120 may store the information on the changed power state V/F State_2 in a storage (e.g., the memory 140 or the register) accessible by the interrupt controller 130, and transmit an alarm message or event to the interrupt controller 130.

The interrupt controller 130 may control the interrupt rate generated by the peripheral device 150 for the processor 110 based on the power state V/F State of the processor 110 according to a monitoring result of the power management governor 120.

As an example, the interrupt controller 130 may receive the power state V/F State of the processor 110 from the power management governor 120 for each unit time or periodically. For example, the interrupt controller 130 may read the power state V/F State from the storage (e.g., the memory 140 or the register) in which the power management governor 120 stores the power state V/F State for each unit time or periodically. For example, the interrupt controller 130 may receive a message or event periodically from the power management governor 120, and acquire a power state V/F State included in the message or event.

In one example, when the interrupt controller 130 receives a message or event from the power management governor 120, the interrupt controller 130 may acquire a power state V/F State of the processor 110. For example, when the interrupt controller 130 receives the message or event, the interrupt controller 130 may read the power state V/F State from the storage (e.g., the memory 140 or the register) in which the power management governor 120 stores the power state V/F State. For example, when the interrupt controller 130 receives the message or event from the power management governor 120, the interrupt controller 130 may acquire a power state V/F State included in the message or event.

While the application is being executed, the interrupt controller 130 may control the interrupt rate according to a change in power state V/F State of the processor 110 corresponding to a processor utilization of the processor 110.

Here, the power state of the processor 110 monitored by the power management governor 120 includes a voltage and a frequency applied to the processor 110, as information associated with a current utilization of the processor 110. The power management governor 120 may determine the voltage and the frequency applied to the processor 110 based on the utilization of the processor 110.

For example, a power state in which the voltage and the frequency applied to the processor 110 is increased represents that the utilization of the processor 110 has increased.

For example, a power state in which the voltage and the frequency applied to the processor 110 is decreased represents that the utilization of the processor 110 has decreased.

That is, the power state of the processor 110 monitored by the power management governor 120 becomes an indirect indicator to determine an increase/decrease in the utilization of the processor 110. In other words, the power state of the processor 110 means a power consumption state of the processor 110 according to the increase/decrease of the processor utilization.

The interrupt controller 130 may control an interrupt rate according to a change in the power state corresponding to the utilization of the processor 110.

For example, the interrupt controller 130 may decrease the interrupt rate as the power state corresponding to the utilization of the processor 110 increases. For example, the interrupt controller 130 may decrease the interrupt rate in inverse proportion to an increase in voltage and frequency values of the processor 110.

For example, the interrupt controller 130 may increase the interrupt rate as the power state corresponding to the utilization of the processor 110 decreases. For example, the interrupt controller 130 may increase the interrupt rate in inverse proportion to a decrease in voltage and frequency values of the processor 110.

In one example, the interrupt controller 130 may store the determined interrupt rate information in an IR register of the peripheral device 150. The peripheral device 150 may generate an interrupt for the processor 110 based on the interrupt rate stored in the IR register.

In one example, the peripheral device 150 may generate an interrupt in the processor 110 according to the interrupt rate stored in the IR register. For example, the peripheral device 150 may generate an interrupt in the processor 110 for each time period in which the interrupt rate is represented.

In one example, in FIG. 3, a dotted box may correspond to a module implemented in software, and a solid box may correspond to a hardware module.

FIG. 4 is a diagram for illustratively describing an interrupt control process of the interrupt control apparatus according to an embodiment.

As described above with reference to FIG. 3, the power management governor 120 monitors a power state V/F State based on a utilization CPU util. of the processor 110, and provides the power state V/F State to the interrupt controller 130.

The interrupt controller 130 may determine an interrupt rate based on the provided power state V/F State. In this process, the interrupt controller 130 may refer to the interrupt rate for each power state stored in the mapping table 170.

In one example, the mapping table 170 may be generated by performing offline profiling by the processor 110, and stored in the memory 140. For example, the mapping table 170 may store an interrupt rate IR0, . . . , IRn determined by each power state P0, . . . , Pn. The offline profiling will be described below with reference to FIG. 5.

The interrupt controller 130 may set an interrupt rate of the peripheral device 150 based on the interrupt rate determined based on a current power state V/F State of the processor 110. For example, when the power state V/F State is Pn, the interrupt rate of the peripheral device 150 may be set to IRn.

The peripheral device 150 may generate an interrupt for the processor 110 based on the set interrupt rate. For example, the peripheral device 150 may determine the number of interrupts # of interrupts per unit time based on the set interrupt rate.

FIG. 5 illustrates an example of a mapping table of an offline profiling result used in the interrupt control process according to an embodiment.

The processor 110 may perform offline profiling for the power state V/F State of the processor 110 and the interrupt rate.

To this end, the processor 110 may determine an interrupt rate for each power state V/F State based on an energy consumption amount and a latency time while a predefined I/O load is being executed.

Here, the energy consumption amount refers to a consumption amount of the entire energy of the processor including the energy consumed in performing a given I/O load. The power management governor 120 may acquire an energy consumption amount based on the power state of the processor 110 while the predefined I/O load is being executed.

The latency refers to a waiting time until the I/O load is processed or a time required until the I/O load is completed. For example, the offline profiling is a program executable by the processor 110, and may include instructions for counting the latency.

The offline profiling process is as follows.

The processor 110 calculates a set of average power states (average V/F states) while performing an application having various I/O loads (e.g., request per second) in conjunction with the power management governor 120. The set of average power states includes average voltages and frequencies for one or more I/O loads.

The processor 110 determines an interrupt rate for minimizing processor utilization without increasing a tail response latency with respect to a pair of each average voltage and frequency.

Subsequently, the processor 110 determines an interrupt rate for minimizing the processor utilization without increasing the tail response latency, which is the most energy efficient with respect to all the power states, using regression for the power state V/F State and the interrupt rate.

As a result, the processor 110 may determine an interrupt rate with the lowest energy consumption amount as the interrupt rate for the corresponding power state V/F State among one or more interrupt rates which satisfy a predetermined latency requirement for each power state V/F State when executing the predefined I/O load as a result of executing the offline profiling. Here, the predetermined latency requirement may apply a 95th percentile latency (P95) or 99th percentile latency (P99) matrix.

The processor 110 may store the mapping table 170 for the interrupt rate for each power state V/F State acquired by the offline profiling result in the memory 140.

The interrupt controller 130 may acquire an initiation value of an interrupt rate of an application based on such an offline profiling result. Hereinafter, the interrupt control process according to an embodiment will be described with reference to FIGS. 6 and 7.

Figure 6:
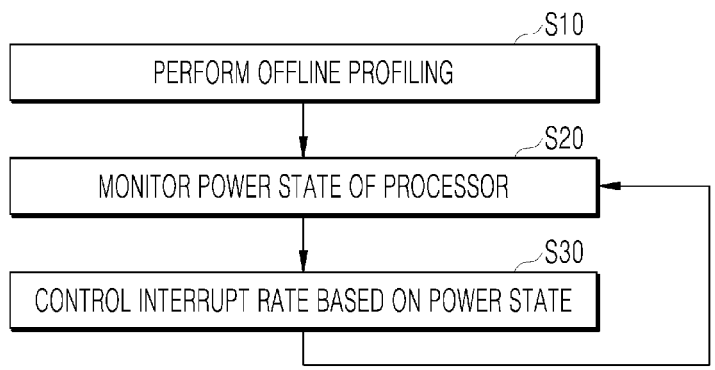
FIG. 6 is a flowchart of an interrupt control method according to an embodiment.

FIG. 6 is a flowchart of an interrupt control method according to an embodiment.

The interrupt control method according to this embodiment may include a step S10 of performing offline profiling for a power state and an interrupt rate by the processor 110.

Step S10 may include determining an interrupt rate for each power state based on an energy consumption amount and a latency while the processor 110 is executing a predefined I/O load.

Step S10 may further include storing an offline profiling result as a mapping table of the interrupt rate for each power state in the memory 140.

The offline profiling process of step S10 is as described above with reference to FIG. 5.

The interrupt control method according to this embodiment may include a step S20 of monitoring, by the power management governor 120, a power state of the processor 110 that is executing an application involving the I/O load for the peripheral device 150, and a step S30 of controlling, by the interrupt controller 130, the interrupt rate generated by the peripheral device 150 for the processor 110 based on the power state of the processor 110.

Here, the power state includes a voltage and a frequency applied to the processor 110, and in step S20, the power management governor 120 may determine the voltage and the frequency applied to the processor 110 based on the utilization of the processor 110.

In step S20, the power management governor 120 may monitor the power state of the processor 110 periodically. In step S20, the power management governor 120 periodically monitors voltage and frequency values from a power management method of determining the voltage and frequency values of the processor based on CPU utilization.

Step S30 may include controlling an interrupt rate according to a change in the power state corresponding to the utilization of the processor 110 by the interrupt controller 130, while the application is being executed.

Step S30 may include acquiring an initiation value of the interrupt rate of the application based on the offline profiling result of step S10.

The interrupt controller 130 performs step S30 when the power state is provided from the power management governor 120 in step S20. For example, the interrupt controller 130 may periodically be provided with the power state from the power management governor 120, and perform step S30 according to the same period. For example, the interrupt controller 130 may perform step S30 upon receiving a message or event for a power state different from the previous state from the power management governor 120.

Meanwhile, steps S20 and S30 may be performed again until the performance of the application is completed.

Hereinafter, step S30 will be described in detail with reference to FIG. 7.

Figure 7:
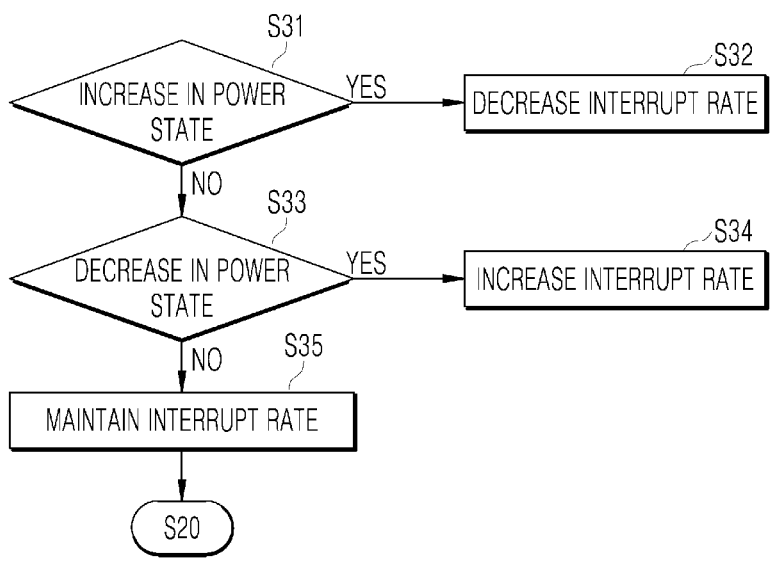
FIG. 7 is a detailed flowchart of an interrupt control step of the interrupt control method according to an embodiment.

FIG. 7 is a detailed flowchart of an interrupt control step of the interrupt control method according to an embodiment.

Referring to FIG. 6, step S30 may include steps S31 to S35 illustrated in FIG. 7.

In steps S31 and S32, the interrupt controller 130 may decrease the interrupt rate as the power state of the processor 110 corresponding to the utilization of the processor 110 increases.

In step S31, the interrupt controller 130 determines whether the power state of the processor 110 has increased. Here, an increased power state means that the processor utilization represented by the current power state received from the power management governor 120 has increased more than the processor utilization represented by the previous power state.

For example, in step S31, when the current voltage and frequency values of the processor 110 received from the power management governor 120 are larger than the previous voltage and frequency values, this means that the processor 110 is not available. Accordingly, in step S32, the interrupt controller 130 may decrease the interrupt rate to alleviate an interrupt processing overhead of the processor 110.

When the power state of the processor 110 has increased in step S31, the interrupt controller 130 may decrease the interrupt rate of the peripheral device 150 in step S32. For example, the interrupt controller 130 may decrease the interrupt rate based on the offline profiling result in step S10.

In steps S33 and S34, the interrupt controller 130 may increase the interrupt rate as the power state of the processor 110 corresponding to the utilization of the processor 110 decreases.

In step S33, the interrupt controller 130 determines whether the power state of the processor 110 has decreased. Here, a decreased power state means that the processor utilization represented by the current power state received from the power management governor 120 has decreased more than the processor utilization represented by the previous power state.

For example, in step S33, when the current voltage and frequency values of the processor 110 received from the power management governor 120 are smaller than the previous voltage and frequency values, this means that the processor 110 is available. Accordingly, in step S34, the interrupt controller 130 may increase the interrupt rate to improve the I/O processing performance of the processor 110 to the peripheral device 150.

When the power state of the processor 110 has decreased in step S33, the interrupt controller 130 may increase the interrupt rate of the peripheral device 150 in step S34. For example, the interrupt controller 130 may increase the interrupt rate based on the offline profiling result in step S10.

In step S35, when there is no change in the power state of the processor 110, the interrupt controller 130 may maintain the current interrupt rate.

For example, when the current voltage and frequency values of the processor 110 received from the power management governor 120 are the same as the previous voltage and frequency values, the interrupt controller 130 may maintain the current interrupt rate.

Figure 8A:
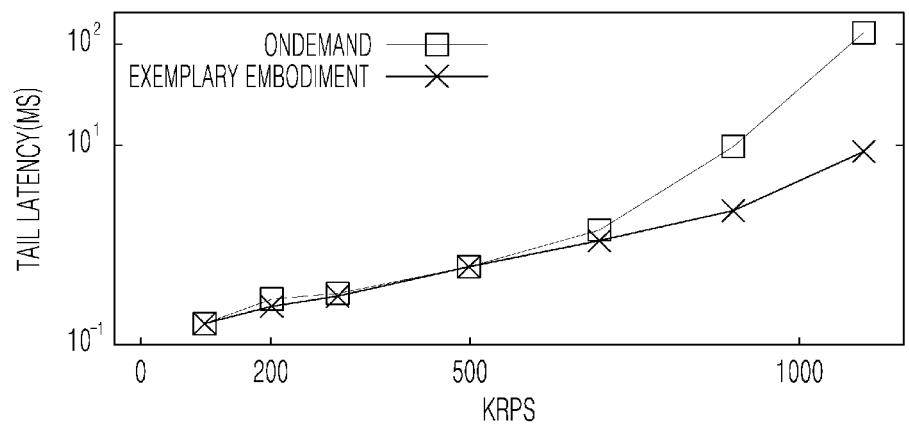
FIG. 8A is a graph showing the performance of the interrupt control method according to an embodiment.

FIG. 8A is a graph showing the performance of the interrupt control method according to an embodiment.

FIG. 8A is a graph measuring an ondemand as a general power management governor of Linux for Memcached as a representative key-value store benchmark and a 95th percentile latency (P95) of the interrupt control apparatus 100 according to an Exemplary embodiment of the present disclosure.

Referring to FIG. 8A, it can be seen that the interrupt control apparatus 100 according to the exemplary embodiment starts to show a significant improvement of P95 from 700 KRPS. Further, the interrupt control apparatus 100 according to the exemplary embodiment improves the P95 up to 15.9 times at a maximum load (that is, 1100 KRPS) as compared with the ondemand.

Since the interrupt control apparatus 100 according to the exemplary embodiment decreases a load for the processor at a high load with high processor utilization, it can be seen that the tail response latency is substantially improved at the high load.

Figure 8B:
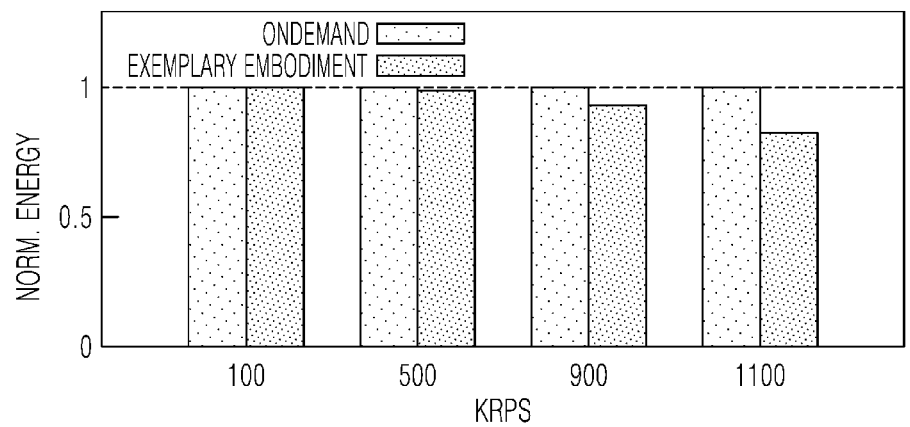
FIG. 8B is a graph showing the performance of the interrupt control method according to an embodiment.

FIG. 8B is a graph showing the performance of the interrupt control method according to an embodiment.

FIG. 8B is a graph measuring the energy consumption of an ondemand for Memcached and the interrupt control apparatus 100 according to the exemplary embodiment of the present disclosure.

Referring to FIG. 8B, it can be seen that the energy consumption amount of the interrupt control apparatus 100 decreases from 500 KRPS, which is when the tail latency starts to rapidly increase in FIG. 8A. In addition, it is illustrated that the interrupt control apparatus 100 consumes 17.6% less energy than the ondemand in a high I/O load (1100 KRPS).

The adaptive interrupt control method according to the embodiment reduces the interrupt processing overhead of the processor 110 and induces the voltage and frequency to be set lower when the power management governor 120 sets the voltage and frequency values of the processor based on the CPU utilization. Therefore, it is possible to improve the energy efficiency as well as the performance of a system with high I/O processing importance.

Further, it is possible to more precisely monitor the state of the processor 110 and provide the energy efficiency through the monitored value by considering the voltage and frequency states of the processor 110. Further, when applied to a data center with large maintenance costs according to an energy consumption amount, it is possible to reduce the overall maintenance costs of the data center.

The exemplary embodiments described above may be implemented through computer programs executable through various components on a computer, and such computer programs may be recorded on computer-readable media. Examples of the computer-readable media may include magnetic media such as a hard disk, a solid state drive (SSD), a silicon disk drive (SDD), a floppy disk, and a magnetic tape; optical recording media such as a CD-ROM and a DVD-ROM; magneto-optical media such as a floptical disk; and hardware devices that are specially configured to store and execute program instructions, such as a ROM, a RAM, and a flash memory.

The computer programs may be those specially designed and constructed for the purposes of the present disclosure or they may be of the kind well known and available to those skilled in the computer software arts. Examples of the computer programs may include not only machine language codes generated by compilers but also high-level language codes that can be executed by computers using interpreters.

The present disclosure described as above is not limited by the aspects described herein and accompanying drawings. It should be apparent to those skilled in the art that various substitutions, changes and modifications which are not exemplified herein but are still within the spirit and scope of the present disclosure may be made. Therefore, it should be understood that the exemplary embodiments described above are illustrative in all respects and not restrictive. For example, each component described as a single type may be implemented in a dispersed form, and likewise, components described as distributed may also be implemented in a combined form.

The scope of the present disclosure is defined not by the detailed description, but by the claims and their equivalents, and all variations within the scope of the claims and their equivalents are to be construed as being included in the present disclosure.

What is claimed is:

1. An interrupt control apparatus comprising:
a power management governor configured to monitor a power state of a processor executing an application involving an I/O load for a peripheral device; and
an interrupt controller configured to control an interrupt rate generated by the peripheral device for the processor based on the power state of the processor,
wherein the power management governor configured to generate information about a corresponding changed power state to improve energy efficiency of the processor when a monitored power state is different from a previous power state and to provide the information about a corresponding changed power state to the interrupt controller, and
wherein the interrupt controller is configured to control the interrupt rate according to the information about a corresponding changed power state corresponding to a utilization of the processor while the application is being executed.

2. The interrupt control apparatus of claim 1, wherein the power management governor monitors the power state of the processor periodically.

3. The interrupt control apparatus of claim 1,
wherein the power state comprises a voltage and a frequency applied to the processor, and
wherein the power management governor determines the voltage and the frequency applied to the processor based on the utilization of the processor.

4. The interrupt control apparatus of claim 1, further comprising:
a processor configured to perform offline profiling for the power state and the interrupt rate,
wherein the processor is configured to determine the interrupt rate for each power state based on an energy consumption amount and a latency while executing a predefined I/O load.

5. The interrupt control apparatus of claim 4, wherein the interrupt controller acquires an initial value of the interrupt rate of the application based on the offline profiling result.

6. The interrupt control apparatus of claim 4, further comprising a memory which stores the offline profiling result as a mapping table of the interrupt rate for each power state.

7. The interrupt control apparatus of claim 1, wherein the interrupt controller is configured to decrease the interrupt rate as the power state of the processor increases.

8. The interrupt control apparatus of claim 1, wherein the interrupt controller is configured to increase the interrupt rate as the power state of the processor decreases.

9. An interrupt control method comprising steps of:
monitoring, by a power management governor, a power state of a processor executing an application involving an I/O load for a peripheral device; and
controlling, by an interrupt controller, an interrupt rate generated by the peripheral device for the processor based on the power state of the processor,
wherein the controlling of the interrupt rate comprises;
receiving information about a corresponding changed power state transmitted from the power management governor to improve energy efficiency of the processor when a monitored power state is different from a previous power state, and controlling the interrupt rate according to the information about a corresponding changed power state corresponding to a utilization of the processor while the application is being executed.

10. The interrupt control method of claim 9, wherein the monitoring comprises periodically monitoring the power state of the processor.

11. The interrupt control method of claim 9, wherein the power state comprises a voltage and a frequency applied to the processor, and wherein the monitoring of the power state comprises determining the voltage and the frequency applied to the processor based on the utilization of the processor.

12. The interrupt control method of claim 9, further comprising performing, by the processor, offline profiling for the power state and the interrupt rate, wherein the performing of the offline profiling comprises determining the interrupt rate for each power state based on an energy consumption amount and a latency while a predefined I/O load is being executed.

13. The interrupt control method of claim 12, wherein the controlling of the interrupt rate comprises acquiring an initial value of the interrupt rate of the application based on the offline profiling result.

14. The interrupt control method of claim 12, further comprising storing the offline profiling result as a mapping table of the interrupt rate for each power state in memory.

15. The interrupt control method of claim 9, wherein the controlling of the interrupt rate comprises decreasing the interrupt rate as the power state of the processor increases.

16. The interrupt control method of claim 9, wherein the controlling of the interrupt rate comprises increasing the interrupt rate as the power state of the processor decreases.

* * * * *